(12) United States Patent
Zhang et al.

(10) Patent No.: US 9,260,789 B2
(45) Date of Patent: Feb. 16, 2016

(54) UNDERPOTENTIAL DEPOSITON OF METAL MONOLAYERS FROM IONIC LIQUIDS

(75) Inventors: Weilong Zhang, Glastonbury, CT (US); Xiaomei Yu, Westport, CT (US); Lei Chen, South Windsor, CT (US); Mark R. Jaworowski, Glastonbury, CT (US); Joseph J. Sangiovanni, West Suffield, CT (US)

(73) Assignee: United Technologies Corporation, Hartford, CT (US)

( * ) Notice: Subject to any disclaimer, the term of this patent is extended or adjusted under 35 U.S.C. 154(b) by 729 days.

(21) Appl. No.: 13/470,713

(22) Filed: May 14, 2012

(65) Prior Publication Data

US 2013/0302641 A1    Nov. 14, 2013

(51) Int. Cl.

| | |
|---|---|
| *C25D 5/10* | (2006.01) |
| *C25D 5/00* | (2006.01) |
| *C25D 5/34* | (2006.01) |
| *C25D 5/44* | (2006.01) |
| *C25D 5/48* | (2006.01) |
| *C25D 3/66* | (2006.01) |
| *C23C 28/00* | (2006.01) |
| *B32B 15/01* | (2006.01) |
| *C23C 28/02* | (2006.01) |
| *C25D 3/44* | (2006.01) |

(Continued)

(52) U.S. Cl.
CPC . *C25D 5/44* (2013.01); *B32B 15/01* (2013.01); *B32B 15/016* (2013.01); *C23C 28/02* (2013.01); *C25D 3/44* (2013.01); *C25D 3/665* (2013.01); *C25D 5/003* (2013.01); *C25D 5/10* (2013.01); *C25D 5/18* (2013.01); *C25D 5/40* (2013.01); *Y10T 428/12764* (2015.01); *Y10T 428/24942* (2015.01)

(58) Field of Classification Search
CPC .............. C25D 5/10; C25D 5/34; C25D 5/44; C25D 5/48; C23C 28/00
USPC ......... 205/183, 191, 205, 219, 230, 233, 170, 205/171
See application file for complete search history.

(56) References Cited

U.S. PATENT DOCUMENTS

| | | |
|---|---|---|
| 5,320,736 A | 6/1994 | Stickney et al. |
| 5,385,661 A | 1/1995 | Andricacos et al. |
| 5,814,556 A | 9/1998 | Wee et al. |

(Continued)

FOREIGN PATENT DOCUMENTS

| | | |
|---|---|---|
| JP | 2000258573 A | 9/2000 |
| WO | 2011099955 A1 | 8/2011 |

OTHER PUBLICATIONS

Skriver, H.L. and N.M. Rosengaard, Physical Review B, vol. 46, No. 11, Sep. 15, 1992.*

(Continued)

*Primary Examiner* — Edna Wong
(74) *Attorney, Agent, or Firm* — Kinney & Lange, P.A.

(57) ABSTRACT

A metal article comprises an alloy substrate having a surface and a non-diffused metal monolayer disposed thereon. The surface has a first surface work function value $\Phi_s$. The non-diffused monolayer deposited on the surface has a second surface work function value $\Phi_s$ that is less negative than the first surface work function value. A method for depositing the monolayer via underpotential deposition (UPD) is also disclosed.

24 Claims, 3 Drawing Sheets

(51) Int. Cl.
*C25D 5/18* (2006.01)
*C25D 5/40* (2006.01)

(56) References Cited

U.S. PATENT DOCUMENTS

| | | | |
|---|---|---|---|
| 5,916,695 | A | 6/1999 | Fister et al. |
| 2009/0011577 | A1* | 1/2009 | Huang et al. ................ 438/488 |
| 2010/0119866 | A1 | 5/2010 | Perepezko et al. |
| 2013/0260171 | A1* | 10/2013 | Harkins ....................... 428/607 |

OTHER PUBLICATIONS

Jiang et al., "Electrodeposition of Aluminum from Ionic Liquids: Part I—Electrodeposition and Surface Morphology of Aluminum from Aluminum Chloride (AlCl3)-1-Ethyl-3-Methylimidazolium Chloride ([EMlm]Cl) Ionic Liquids," Surface & Coatings Technology (no month, 2006), vol. 201, pp. 1-9.*

Lehnert et al., "A Model for the Adsorption of a Commensurate Layer of Metal Ions on a Single Crystal Substrate," J. Electroanal. Chem. (no month, 1991), vol. 310, pp. 27-37.*

The International Search Report mailed Jul. 8, 2013 for International Application No. PCT/US2013/036083.

Jovic, V. D., "Underpotential and over potential deposition of Al onto Cu(111) from the AlCl3-EtMelmCl room temperature molten salt", Journal of Serbian Chemical Society 71 (4), pp. 373-385 (2006).

Fall, "AB Initio Study of the Work Functions of Elemental Metal Crystals", Thesis No. 1955, Ecole Polytechnique Federale De Lausanne, 1999.

Hoffman, P., Lecture Notes on Surface Science, Chapter 8—"The electronic structure of surfaces". Retrieved from http://philiphoffman.net/surflec3/surflec015.html on May 11, 2012.

* cited by examiner

UNDERPOTENTIAL DEPOSITON OF METAL MONOLAYERS FROM IONIC LIQUIDS

BACKGROUND

The application relates generally to coating of metallic substrates, and more specifically to applying a nondiffused metal coating to an alloy substrate.

Bulk metal coatings have previously been applied directly onto substrates by electrically plating the substrate using an aqueous electrolyte solution, often referred to as electrolytic deposition, electrodeposition, or electroplating. Coatings of more active metals provide protection to the base materials by sacrificial corroding of the coatings, thus have been used extensively. Specifically, an aluminum coating has been shown to be a drop-in replacement of cadmium to protect high strength steel, which is susceptible to hydrogen embrittlement when it is protected by zinc or zinc alloys electroplated in an aqueous plating bath. The only commercial Al electroplating technology in the U.S. is Alumiplate™, which employs a bath that is pyrophoric (triethlyaluminium in toluene) and operates above room temperature (at 100° C.). Such Al electroplating can be difficult and dangerous to implement due in some part to the pyrophoric nature of the plating chemistry and use of organic solvents such as toluene. Toluene is currently listed by the U.S. Environmental Protection Agency (EPA) as a hazardous air pollutant (HAP). The process is also complicated or rendered incompatible for many combinations of coatings and substrates.

Other more advanced coating processes have been developed but each have shortcomings. Thin film chemical vapor deposition (CVD) and physical vapor deposition (PVD) can often be used for more precise control, but cannot be readily scaled up to larger industrial processes, nor is it a practical substitute for bulk deposition of thicker coatings. Recent advances in ionic liquids and related processes have shown promise for depositing metallic coatings directly onto a substrate. Many such coatings are otherwise difficult, dangerous, or impossible to deposit using aqueous electrolytes, e.g. Al, Ti and W coatings. These metals are abundant and excellent for corrosion resistance. However, problems have arisen with ensuring consistent chemical and structural compatibility and adhesion between substrates and the bulk metal layer.

SUMMARY

A method for coating a metal article comprises providing an alloy substrate, engineering at least one surface to be coated on the alloy substrate, each of the at least one surfaces having a surface work function value $\Phi_s$. An ionic liquid deposition solution is formed containing a precursor of a depositing species having a work function value $\Phi_d$ that is less negative than the surface work function $\Phi_s$. A monolayer is deposited via underpotential deposition (UPD) by cathodically reducing the precursor of the depositing species from the ionic liquid deposition solution onto the surface of the alloy substrate, the deposited monolayer having a depositing work function value $\Phi_d$ that is less negative than the surface work function value $\Phi_s$.

Optionally, the method further comprises depositing a bulk layer onto the monolayer after the UPD depositing step.

When the method further comprises depositing a bulk layer onto the monolayer after the UPD depositing step, the monolayer and the bulk layer are optionally both substantially pure aluminum.

When the method further comprises depositing a bulk layer onto the monolayer after the UPD depositing step, and when the monolayer and the bulk layer are both substantially pure aluminum, the method optionally further comprises anodizing at least a portion of an outer surface of the bulk aluminum layer after the bulk depositing step.

The engineering step of the method optionally includes increasing first surface work function value $\Phi_s$ by selectively configuring the alloy substrate such that the surface to be coated has a surface work function value $\Phi_s$ greater than work function values of at least one surface of the alloy substrate that is not to be coated by the monolayer.

When the engineering step of the method includes increasing first surface work function value $\Phi_s$ by selectively configuring the alloy substrate such that the surface to be coated has a surface work function value $\Phi_s$ greater than work function values of at least one surface of the alloy substrate that is not to be coated by the monolayer, the alloy substrate optionally has a directionally solidified face centered cubic (FCC) microstructure.

When the engineering step of the method includes increasing first surface work function value $\Phi_s$ by selectively configuring the alloy substrate such that the surface to be coated has a surface work function value $\Phi_s$ greater than work function values of at least one surface of the alloy substrate that is not to be coated by the monolayer, and when the alloy substrate has a directionally solidified face centered cubic (FCC) microstructure, the surface to be coated optionally runs substantially along the (100) plane of the FCC microstructure.

When the engineering step of the method includes increasing first surface work function value $\Phi_s$ by selectively configuring the alloy substrate such that the surface to be coated has a surface work function value $\Phi_s$ greater than work function values of at least one surface of the alloy substrate that is not to be coated by the monolayer, when the alloy substrate has a directionally solidified face centered cubic (FCC) microstructure, and when the surface to be coated runs substantially along the (100) plane of the FCC microstructure, the alloy substrate optionally includes a majority by weight of aluminum.

The engineering step optionally includes cleaning the surface to be coated in a substantially oxygen-free atmosphere and maintaining the at least one surface to be coated in a substantially oxygen-free atmosphere through the depositing step.

The UPD depositing step optionally includes increasing the voltage in a stepwise fashion to form a plurality of monolayers.

The optional stepwise voltage increase to form a subsequent monolayer optionally occurs after substantially complete deposition of a preceding monolayer.

Optionally, the method further comprises depositing an interlayer onto the surface to be coated prior to the monolayer depositing step.

When the method further comprises depositing an interlayer onto the surface to be coated prior to the monolayer depositing step, the interlayer optionally has a work function value intermediate between a work function value of the surface to be coated and a work function value of the monolayer.

A metal article comprises an alloy substrate including a surface to be coated and a non-diffused metal monolayer disposed thereon. The surface has a first surface work function value $\Phi_s$. The non-diffused monolayer deposited on the surface has a second surface work function value $\Phi_s$ that is less negative than the first surface work function value.

Optionally, the article further comprises a bulk layer deposited atop the monolayer.

The surface of the alloy substrate is optionally substantially free of surface adsorbed impurities between the substrate and the monolayer.

The surface of the alloy substrate optionally has a selectively configured lattice orientation for increasing a first surface work function value $\Phi_s$ as compared to non-coated surfaces of the alloy substrate.

When the surface of the alloy substrate has a selectively configured lattice orientation for increasing a first surface work function value $\Phi_s$ as compared to non-coated surfaces of the alloy substrate, the alloy substrate optionally has a directionally solidified face centered cubic (FCC) microstructure.

When the alloy substrate has a directionally solidified face centered cubic (FCC) microstructure, the alloy substrate optionally includes a majority by weight of aluminum.

When the alloy substrate has a directionally solidified face centered cubic (FCC) microstructure and the alloy substrate includes a majority by weight of aluminum, the at least one surface to be coated is optionally configured to be primarily along (100) lattice planes of the aluminum alloy substrate.

The monolayer optionally consists of substantially pure aluminum.

Optionally, the article further comprises an interlayer disposed between the surface of the alloy substrate and the monolayer, the interlayer being a different metal than the monolayer and a base element of the alloy substrate.

DETAILED DESCRIPTION

Figure 1A:
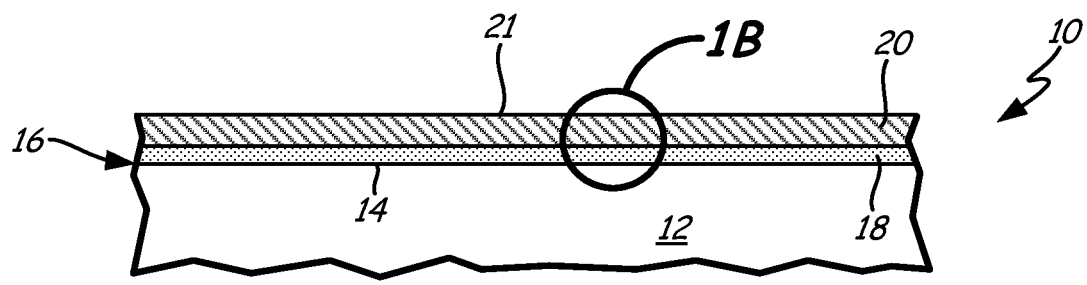
FIG. 1A shows a cross-section of a coated metal article having an engineered substrate surface, a monolayer and a bulk deposition layer.
Figure 1B:
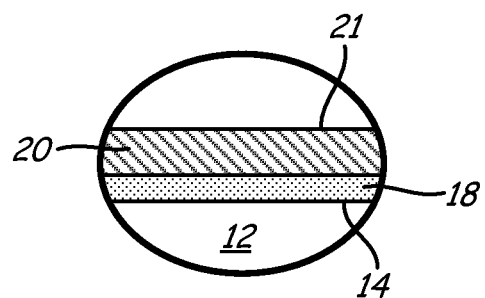
FIG. 1B is a magnified view of a portion of the cross-section shown in FIG. 1A.

FIG. 1 includes article 10, alloy substrate 12, engineered substrate surface 14, coating 16, monolayer 18, bulk deposition layer 20, and coating outer surface 21. Coated article 10 can be made for any number of applications requiring a coating a surface of an alloy substrate, and thus the choice of material for substrate 12 and coating 16 will be suitable for the chosen application. In the illustrative example, substrate 12 is an aluminum alloy and coating 16 is substantially pure aluminum. In certain aluminum based embodiments, article 10 can be used in various structural aircraft components as well as for cold section use in gas turbine engines.

Alloy substrate 12 includes engineered substrate surface 14 with coating 16. Coating 16 includes monolayer 18 and bulk deposition layer 20. Monolayer 18 is a very thin layer substantially contiguous with the lattice of the alloy substrate, and can be as thin as a single atomic unit cell. Monolayer 18 is applied so as to act as a non-diffused stable "seed" or "bonding" surface for bulk deposition layer 20. Monolayer 18 thus can strengthen the bond between substrate 12 and bulk deposition layer 20 without diffusing the coating into the substrate, which also simplifies repair and refurbishment of article 10. As will be explained, in certain embodiments both monolayer 18 and bulk deposition layer 20 can be the same metal, such as substantially pure aluminum. In the case of aluminum coating 16, an outer surface 21 of bulk layer 20 may optionally be anodized or otherwise protected according to traditional methods.

In this example, non-diffused monolayer 18 is deposited first onto engineered substrate surface 14 via underpotential deposition (UPD) from an ionic liquid deposition solution. UPD refers to depositing at least a thin layer on the surface of a substrate at a potential less negative than the Nernst (equilibrium) potential required for bulk deposition. As will be seen, this provides a stable non-diffused base for the bulk coating. Bulk coatings have been traditionally applied directly to an article via aqueous electrodeposition. Some plating materials like aluminum and titanium cannot be electrodeposited in bulk from aqueous solutions. Water from the aqueous solution can dissociate into hydrogen and oxygen ions at a voltage lower than what is necessary for the metal cation to reduce out of solution to its metallic state. In other cases, substrates like high strength steel are prone to hydrogen embrittlement. Al plating from ionic liquids offers a promising solution to these issues, but the challenge is the Al film coating adhesion to the substrate. Even when materials and conditions are suitable for bulk depositing a coating, coating bond strength still depends on substrate structure and cleanliness, agitation, temperature, aqueous electrolyte chemistry, and modulation of the electric field during plating.

Film deposition techniques have been developed to more finely control placement of very thin coatings. However, existing thin film deposition techniques like chemical vapor deposition (CVD), physical vapor deposition (PVD), flame spray, laser deposition, etc. are limited to line of sight applications, and regardless of this, the processes cannot be economically scaled up to form useful bulk coatings. In addition, conventional thin film deposition still presents some difficulty and inconsistency in forming a thin film layer onto the substrate, particularly thin films that are substantially coherent with the substrate lattice. While more precise than direct bulk deposition, most film deposition processes rely almost exclusively on controlling the energy and throwing power of the deposition solution, not the substrate or deposition surface thereon. Thus due to surface effects and different alloy phases on the substrate surface under more conventional thin film deposition, the layer often ends up being discontinuously deposited relative to the substrate lattice, undermining the bond between the substrate and the bulk deposition layer. For these and other reasons, to improve coating adherence, incompatible surface energies therefore require that the thin film and/or the bulk layer be at least partially diffused into one another so as to commingle and transition the lattice parameters of the substrate into the coating. However, diffusing the coating into the substrate adds process steps and also complicates later removal and repair of the coating and substrate. Other considerations may indicate diffusion of all or part of coating 16 into the substrate after deposition of coating 16, but such considerations are outside the scope of this disclosure.

In contrast, coating 16 can be effectively bonded to substrate 12 using monolayer 18. UPD application of monolayer 18 facilitated by engineering surface 14 to increase its work function values $\Phi_s$, improves adherence and repair of coating 16. The theoretical work function value $\Phi_0$ of a metal surface is defined as the energy required to remove an electron to a location immediately away from the metal surface. Leaving out complicating surface effects, theoretical work function value $\Phi_0$ is roughly equivalent to the negative of the Fermi energy plus the effective surface dipole. An electron's Fermi energy is a measure of how strongly the electrons in outer valence bands of the metal are retained to the substrate. (i.e., minimum energy of a bound electron at the highest occupied quantum state between valence and conduction bands). The surface dipole represents energy possessed by surface electrons due to lattice discontinuities.

It should be noted that the theoretical work function value $\Phi_0$ is based on assumptions of an infinite surface in a vacuum at absolute zero temperature, and thus a real life metal substrate will have different work function values $\Phi_s$ for different surfaces and even different regions on each surface. A number of factors greatly influence empirical work function values $\Phi_s$. By way of non-limiting examples, any change in adsorption, surface morphology, composition, etc. all can change the value of the work function. UPD works with engineered surface 14 because higher work function values $\Phi_s$ represent increased affinity for electrons toward surface 14. This makes it possible to lower the electrical potential (as compared to the that must be applied to the ionic liquid deposition solution in order to electrochemically reduce cations (precursors) of the depositing species out of the ionic liquid deposition solution onto surface 14. Engineering of surface 14 to increase its work function value $\Phi_s$ for facilitating UPD is discussed below.

Figure 2A:
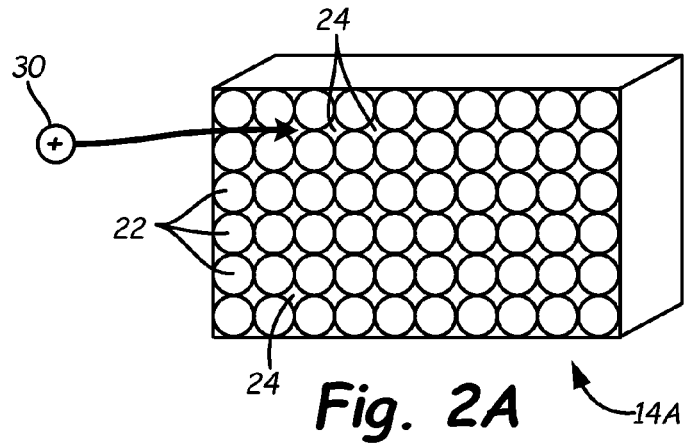
FIG. 2A depicts a first microstructure of an engineered substrate surface prior to deposition of the monolayer.
Figure 2B:
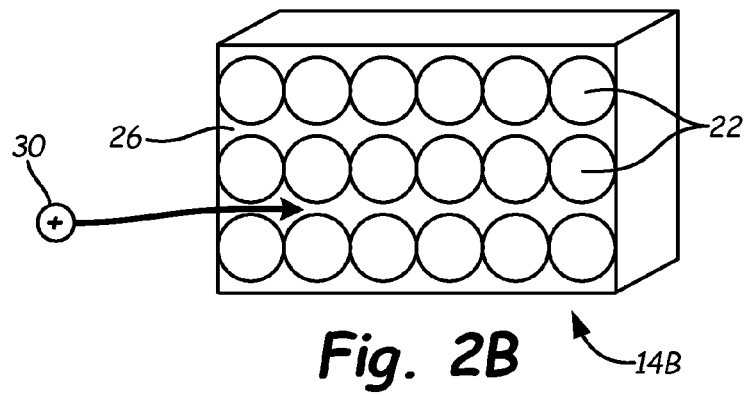
FIG. 2B depicts a second microstructure of an engineered substrate surface prior to deposition of the monolayer.
Figure 2C:
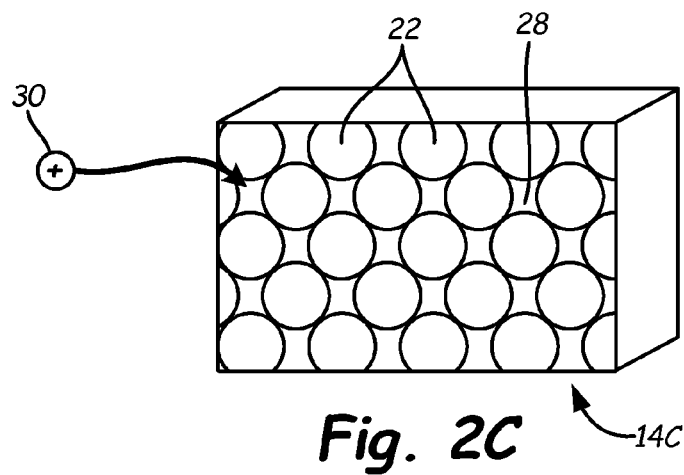
FIG. 2C depicts a third microstructure of an engineered substrate surface prior to deposition of the monolayer.

FIG. 2A shows surface 14A with substrate atoms 22, voids 24, and depositing adatom 30. FIG. 2B has surface 14B with substrate atoms 22, voids 26, and depositing adatom 30. FIG. 2C shows surface 14C with substrate atoms 22, voids 28, and depositing adatom 30. FIG. 2A is a view of face centered cubic (FCC) lattice taken across the (100) crystallographic plane. FIG. 2B shows the FCC lattice taken across the (110) crystallographic plane. FIG. 2C is the FCC lattice taken across the (111) crystallographic plane.

TABLE 1

| Metal | Crystal structure | $\Phi_s$(111) | $\Phi_s$(100) | $\Phi_s$(110) |
|---|---|---|---|---|
| Al | FCC | 4.24 | 4.42 | 4.28 |
| Ag | FCC | 4.56 | 4.42 | 4.35 |
| Au | FCC | 5.26 | 5.22 | 5.20 |
| Cu | FCC | 4.94 | 4.59 | 4.48 |
| Ir | FCC | 5.76 | 5.67 | 5.42 |
| Cr | FCC | ~4.50 | ~4.50 | ~4.50 |
| Ni | FCC | 5.25 | 4.95 | 4.55 |
| W | BCC | 4.47 | 4.63 | 5.25 |

Microstructures, lattice parameters, and Miller indices are known in the art and their details will not be repeated here. In one example of engineering surface 14 to provide a suitable work function $\Phi_s$, article 10 (shown in FIGS. 1A and 1B) can be configured such that surface 14 substantially coincides with one or more of surfaces 14A, 14B, 14C having the highest work function value $\Phi_s$. Table 1 above lists work function values $\Phi_s$ for surfaces having different crystallographic orientations. As is already known, the (111) crystallographic plane has the closest packing of atoms in an FCC lattice thus leaving the smallest voids 28 between atoms 22. This arrangement is also referred to in the art as a cubic close packed (ccp) structure. Open surfaces such as (100) and (110) surfaces respectively have larger voids 24, 26 as seen in FIGS. 2A and 2B. As seen in Table 1, work function values $\Phi_s$ for many FCC metals are higher on the close-packed (111) surface as compared to $\Phi_s$ seen on the more open (100) and (110) surfaces. This is because for many FCC metal substrates except for aluminum (such as Ag, Au, Cu, Ir, Ni, and their alloys), open surfaces usually exhibit the "Smoluchowski" effect of charge smoothing, where a dipole moment develops around atoms 22. This charge smoothing dipole opposes the dipole created by flow-out of electrons, resulting in transfer of surface charge into voids or interstices between atoms (e,g, voids 24 and/or 26). This effect lowers the work function value on many open FCC surfaces, making UPD more difficult as compared to the close packed surfaces of the same alloys.

In contrast to these other FCC alloys, open surfaces of aluminum and most of its common alloys do not strongly exhibit the Smoluchowski effect. As seen in Table 1, the close packed (111) surfaces of aluminum and its alloys have the lowest work function value $\Phi_s$ as compared to their more open (100) and (110) surfaces. So in this example, substrate 12 can be prepared with engineered surface 14 that is co-located with the (100) and/or (110) surface, where the crystallographic orientation is more favorable to UPD with a higher work function value $\Phi_s$.

Just as importantly, it should be noted that aluminum has overall lower work function values than the other example materials listed in the table. While this complicates adhesion of a pure aluminum coating to other substrates using conventional bulk and thin film techniques, it also makes aluminum an excellent candidate for UPD of aluminum monolayers onto both aluminum and non-aluminum based substrates with suitably engineered work function values. The UPD shift ($\Delta$UPD) away from the Nernst bulk deposition potential can be theoretically estimated according to Equation 1:

$$\Delta UPD \sim 0.5 \ast (\Phi_s - \Phi_d) \quad [1]$$

In other words, the UPD shift is approximately half of the difference between the first surface work function value $\Phi_s$ and the work function value $\Phi_d$ of the monolayer formed by the depositing species (adatoms 30). When the surface work function value $\Phi_s$ is higher (more negative) than the depositing species work function value $\Phi_d$, the adatom has a higher affinity for the substrate than for other atoms in the solution, and thus a limited number of these precursors can be cathodically reduced out of solution and onto engineered surface 14 to form monolayer 18. Once deposited, monolayer 18 will then have a less negative second outer surface work function value $\Phi$. As can be seen in Table 1, substantially pure aluminum works well for monolayer 18 on both aluminum alloys as well as other alloys because of relatively large differences in work function values $\Phi_s$ compared to other candidates.

Regardless of the effect on aluminum alloy substrates, it will be appreciated that in the cases of other non-aluminum alloy substrates, substrate 12 can be engineered such that surface 14 to be coated is the surface with a higher work function that is favorable to UPD. For example, in the case of a BCC alloy like tungsten, a higher work function value $\Phi_s$ is available on the (110) surface as compared to other surfaces. It will be recognized that substrate 12 can be engineered to have the selected crystallographic plane by forming substrate 12 either as a directionally solidified or a single crystal alloy casting. Surface 14 can then be a surface of the casting or can be further processed (e.g. machined) into its shape prior to applying coating 16.

In another example of engineering surface 14 to increase work function value $\Phi_s$, surface 14 can be subjected to specialized treatments. One treatment prevents adsorption of oxygen onto the surface. Due to their high electron affinity and larger size voids 24, 26 on respective surfaces 14A, 14B are particularly reactive to oxygen. Additionally, other reactive atmospheric contaminants can also bond to surface 14, which can cause voids 22, 24, and/or 26 to become saturated from reactively adsorbing these gases. If not mitigated, this lowers work function value $\Phi_s$, reducing effectiveness of UPD on surface 14.

In the example of aluminum and aluminum alloys, this issue can be mitigated by surface treatment using a deaerated cleaning solution. In one example, the cleaning solution can be deaerated by bubbling a gaseous mixture through the solution which consists almost exclusively of nitrogen and argon. The argon substantially replaces atmospheric oxygen. In one of these examples, argon comprises about 15 and about 22 mol % of the mixture, with nitrogen substantially comprising the remainder, apart from incidental elements and contaminants. Under a substantially oxygen-free atmosphere, the surface can be cleaned using a deaerated 0.5M to 1M aqueous hydrochloric acid (HCl) or nitric acid ($HNO_3$) solution. The substrate should be maintained in an oxygen free environment, such as using the example atmosphere just described, Other example processes for cleaning and activating an aluminum alloy surface are described in a commonly assigned United States patent application entitled "Method for Surface Cleaning and Activation", filed on an even date herewith, the entirety of which is herein incorporated by reference.

Chemistry of the ionic liquid deposition solution can also be controlled to decrease $\Phi_d$ as well as prevent surface contamination or passivation. In the example of aluminum monolayer deposition, a simple aluminum salt such as aluminum chloride ($AlCl_3$) is mixed with an ionic liquid solvent. In certain embodiments, the ionic liquid solvent is a form of methylimidazolium chloride. In certain of those embodiments, the ionic liquid comprises at least one of: 1-ethyl-3-methylimidazolium chloride, 1-butyl-3-methylimidazolium chloride, 1-butyl-1-methylpyrrolidinium bis(trifluoromethylsulfonyl)amide, 1-ethyl-3-methylimidazolium bis (trifluoromethylsulfonyl)amide, trihexyl-tetraadecyl phosphonium bis(trifluoromethylsulfonyl)amide, and mixtures thereof. To further facilitate UPD, the work function of aluminum cations in the ionic liquid deposition solution can be increased. In this example, a second solvent or a surfactant can be added to the mix in order to further dissociate or "wet" the aluminum cations, lowering their work function $\Phi_d$ and making the aluminum cations more susceptible to deposition upon applying the UPD voltage. Suitable compounds for improving dissociation of aluminum cations can include, but are not limited to sodium dodecyl sulfate (SDS) and trimonium chloride. Such surfactant compounds can be added to the solution at or above their critical micelle concentration (CMC) at which point the cations and anions are most easily separated. The surfactant also attracts and captures many potential surface contaminants preventing a decrease in the surface work function $\Phi_s$ during UPD. Exact surfactant concentrations and the actual CMC threshold will depend on factors like the concentration and choice of the simple metal salt relative to the ionic liquid solvent.

In the presence of the chosen ionic liquid solvent, aluminum cations ($Al^{3+}$) readily dissociate from the halide anions, here chloride ($Cl^-$). Appropriate voltage is then applied through the solution between an anode (not shown) and a cathode (surface 14). This voltage generally is just above the equilibration potential between the depositing cations and the reduced metal. In one illustrative example utilizing $Al^{3+}$ cations reduced to an Al coating, this figure can be on the order of about 50 mV to about 100 mV above the equilibration potential. This figure will depend on the particular choice and concentration of depositing cations, solution temperature, and actual cathode surface work function values $\Phi_s$. To deposit a plurality of monolayers, the voltage can be slowly increased in a stepwise fashion after each individual monolayer is completely formed. The first step application of voltage will result in a single monolayer. The stepwise voltage increase for each subsequent monolayer will initially be less than the initial increase to form the first monolayer, but each step will be progressively larger. Once monolayer 18 has reached an appropriate thickness, voltage is stopped and substrate 12 is removed from the solution and prepared for bulk deposition.

Upon formation of the one or more monolayers 18, bulk layer 20 is then deposited. This can be done from an ionic liquid, or by traditional bulk deposition techniques. It will of course be recognized that if done using a separate tank or other vessel, aluminum monolayer 18 will have to be protected or cleaned during transfer to the bulk deposition vessel so as to prevent or remove oxide buildup. This can be done for example by maintaining plating vessels and the path between them in an oxygen reduced or oxygen free atmosphere similar or identical to one discussed above, which will reduce or prevent oxygen contact with the high work function surface. It will also be recognized that after bulk layer deposition, coating 16 (shown in FIGS. 1A and 1B) can be further processed for protection such as by surface anodization.

Prior to bulk layer 20 deposition, the one or more monolayers 18 will be applied to be thick enough so as to provide an adequate bonding surface for bulk layer 20. This will depend on the lattice compatibility of alloy substrate 12 and bulk coating 20, where more similar lattice parameters generally reflecting the use of fewer monolayer 18. The one or more applied monolayers 18 can be as thin as only a few atomic layers, and will depend in part on the size and packing density of atoms being deposited. In certain embodiments, the thickness of the one or more monolayers 18 is on the order of between about 0.1 nm and about 2.0 nm. In certain of those embodiments, monolayer 18 can be as thick as about 1.0 nm prior to deposition of bulk coating layer 20. Once bonded, monolayers 18 have a high stripping potential as compared to a bulk layer alone, improving adhesion and integrity of coating 16. It also eliminates the need to diffuse coating 16 into substrate 12 which simplifies repair of article 10 by minimizing the quantity and depth material that must be removed and replaced.

Figure 3:
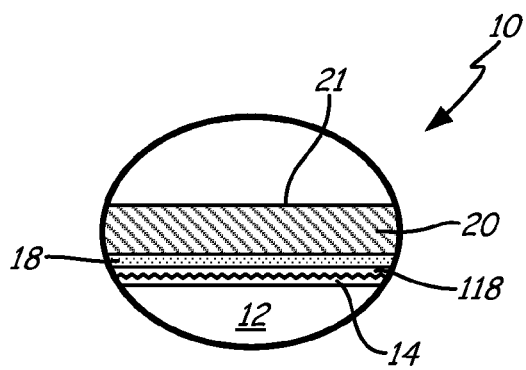
FIG. 3 shows an alternative coated metal article with an interlayer disposed between the monolayer and the engineered substrate surface.

FIG. 3 shows an alternative embodiment with interlayer 118 disposed between substrate surface 14 and monolayer 18. In the earlier described example embodiments, monolayer 18 is the same material as bulk layer 20, as well as being the same as the base element in the alloy defining substrate 12 (e.g., monolayer 18 and bulk layer 20 are aluminum when substrate 12 is an aluminum alloy. However, in some instances such as when there is a different base element for substrate 12, or when the alloy has a sufficiently different lattice parameter as compared to that of monolayer 18, interlayer 118 can be deposited between the monolayer and the substrate to provide any required work function transition therebetween. In one such example, substrate 12 is a nickel-based alloy, monolayer 18 and bulk layer 20 are aluminum, while interlayer 118 is chromium or a chromium-based alloy. This can be seen from Table 1 where chromium (Cr) has an intermediate work function between that of nickel (Ni) and aluminum (Al). Surface 14 can be engineered to increase or optimize its work function value as shown above. Here, interlayer 118 is deposited using a traditional thin film process, such as CVD, PVD, laser deposition or flame spray, while monolayer 18 is deposited onto interlayer 18 from an ionic liquid solution as described above. Interlayer 118 can also be deposited via UPD.

Figure 4:
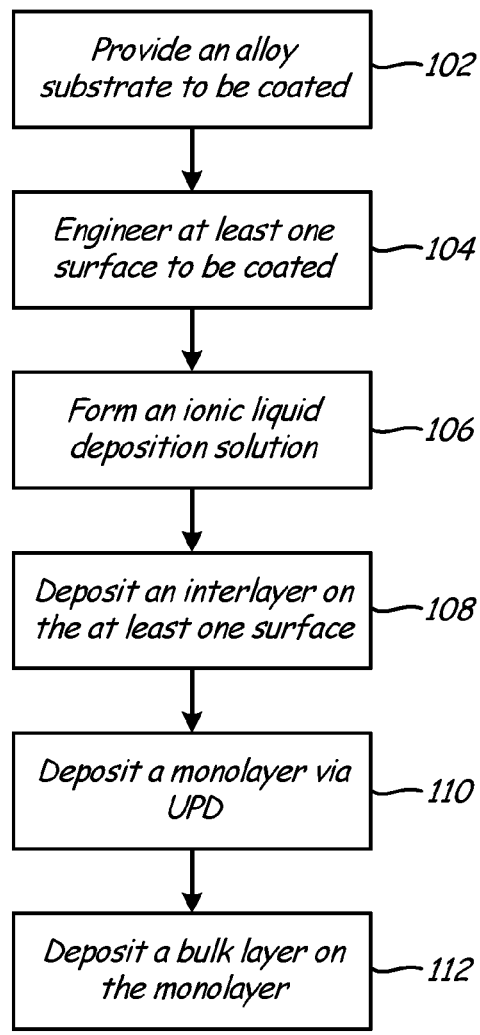
FIG. 4 is a flow chart depicting the steps of the coating process.

FIG. 4 is a flow chart of the process 100. At step 102, an alloy substrate having at least one surface to be coated is provided. Step 104 includes engineering at least one of the surfaces to be coated so as to have its work function value sufficiently negative to have the at least one surface operate as a cathode for underpotential deposition (UPD). This can be done according to one of the methods described above with respect to FIGS. 1 and 2, including but not limited to arranging the crystallographic orientation of the substrate such that the work function value $\Phi_s$ is higher than the other orientations, or is otherwise suitable for UPD. This portion of step 104 can be done simultaneous to step 102, such as during casting. Alternatively a pre-formed single crystal or directionally solidified body of material can be processed so as to form surface(s) 14 on the correct plane(s). As noted above, the work function value $\Phi_s$ of the surface(s) can additionally or alternatively be engineered by cleaning and processing the surface(s) to be coated so as to remove and/or avoid atmospheric adsorption into voids between atoms at or near the surface.

Next, the ionic liquid deposition solution is formed at step 106. At this step, the solution includes the species to be deposited as the monolayer (such as aluminum). As noted above, the solution can be a standard ionic liquid deposition solution when surface 14 has been engineered with a sufficient surface work function value $\Phi_s$. However, the work function value of the depositing species can be also optimized to further facilitate UPD by adding a second solvent or a surfactant such as SDS or trimonium chloride. This can be done in amounts such that the CMC is reached or exceeded which improves dissociation between metal cations and halide anions as noted above. Example embodiments of this cleaning process are detailed in the application incorporated by reference.

After step 106, optional step 108 includes depositing an interlayer prior to depositing the monolayer. The interlayer will be a different metal than either the base element of the alloy substrate and the species being deposited as the monolayer. Depending on the choice of the interlayer, it can be deposited via UPD in a manner similar to applying the monolayer, or according to conventional film deposition techniques.

After step 106 and optional step 108, a monolayer is formed via underpotential deposition at step 110 by passing an electrical charge through the ionic liquid deposition solution between an anode and the at least one engineered surface (acting as the cathode). As the monolayer is formed, the applied voltage (potential) of the substrate (cathode) vs. anode is less than would be required to otherwise reduce the depositing species cations out of the ionic liquid deposition solution (the equilibrium potential). As noted previously, engineering the surface to be coated decreases the required potential for reducing the cations from the solution, and is thus less negative than the equilibrium potential that would otherwise be required to reduce the metal cations out of the plating solution. As discussed above, during the UPD step, the voltage can be increased in a stepwise fashion to deposit a plurality of monolayers.

Finally step 112 is performed by depositing a bulk layer on the monolayer to complete the coating. Deposition of the bulk layer will depend on the particular costs and benefits for each substrate and coating, and can be by any suitable process. In the example of aluminum, bulk layer can be deposited either from an ionic liquid deposition solution without a second solvent or surfactant, or can alternatively be deposited by other conventional processes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for coating a metal article, the method comprising:
   providing an alloy substrate;
   engineering a surface of the alloy substrate to be coated to have a surface work function value $\Phi_s$;
   forming an ionic liquid deposition solution containing a precursor of a depositing species;
   depositing a first of a plurality of monolayers via underpotential deposition (UPD) by cathodically reducing the precursor of the depositing species from the ionic liquid deposition solution onto the surface of the alloy substrate, the first of the deposited plurality of monolayers having a depositing work function value $\Phi_d$ that is less negative than the surface work function value $\Phi_s$; and
   increasing a deposition voltage in a stepwise fashion to form subsequent ones of the plurality of monolayers.

2. The method of claim 1, further comprising
   depositing a bulk layer onto the plurality of monolayers.

3. The method of claim 2, wherein the plurality of monolayers and the bulk layer are both substantially pure aluminum.

4. The method of claim 3, further comprising after the bulk layer depositing step:
   anodizing at least a portion of an outer surface of the bulk aluminum layer.

5. The method of claim 1, wherein the step of engineering a surface includes increasing surface work function value $\Phi_s$ by selectively configuring the alloy substrate such that the surface to be coated has a surface work function value $\Phi_s$ greater than work function values of at least one surface of the alloy substrate that is not to be coated by the monolayer.

6. The method of claim 5, wherein the alloy substrate has a directionally solidified face centered cubic (FCC) microstructure.

7. The method of claim 6, wherein the surface to be coated runs substantially along the (100) plane of the FCC microstructure.

8. The method of claim 7, wherein the alloy substrate includes a majority by weight of aluminum.

9. The method of claim 1, wherein the step of engineering a surface includes cleaning the surface to be coated in a substantially oxygen-free atmosphere and maintaining the surface to be coated in a substantially oxygen-free atmosphere through the depositing step.

10. The method of claim 1, wherein the stepwise voltage increase to form a subsequent monolayer occurs after substantially complete deposition of a preceding monolayer.

11. The method of claim 1, further comprising prior to depositing the first of the plurality of monolayers:
   depositing an interlayer onto the surface to be coated.

12. The method of claim 11, wherein the interlayer has a work function value intermediate between a work function value of the surface to be coated and a work function value of the first monolayer.

13. A method for coating a metal article, the method comprising:
   providing an alloy substrate;

engineering a surface of the alloy substrate to be coated to have a surface work function value $\Phi_s$;

forming an ionic liquid deposition solution containing a precursor of a depositing species;

depositing an interlayer onto the surface to be coated; and depositing a monolayer via underpotential deposition (UPD) by cathodically reducing the precursor of the depositing species from the ionic liquid deposition solution onto the interlayer deposited onto the surface to be coated, the deposited monolayer having a depositing work function value $\Phi_d$ that is less negative than the surface work function value $\Phi_s$.

14. The method of claim 13, further comprising after the UPD depositing step:

depositing a bulk layer onto the monolayer.

15. The method of claim 14, wherein the monolayer and the bulk layer are both substantially pure aluminum.

16. The method of claim 14, further comprising after the bulk layer depositing step:

anodizing at least a portion of an outer surface of the bulk aluminum layer.

17. The method of claim 13, wherein the step of engineering a surface includes increasing surface work function value $\Phi_s$ by selectively configuring the alloy substrate such that the surface to be coated has a surface work function value $\Phi_s$ greater than work function values of at least one surface of the alloy substrate that is not to be coated by the monolayer.

18. The method of claim 17, wherein the alloy substrate has a directionally solidified face centered cubic (FCC) microstructure.

19. The method of claim 18, wherein the surface to be coated runs substantially along the (100) plane of the FCC microstructure.

20. The method of claim 18, wherein the alloy substrate includes a majority by weight of aluminum.

21. The method of claim 13, wherein the step of engineering a surface includes cleaning the surface to be coated in a substantially oxygen-free atmosphere and maintaining the surface to be coated in a substantially oxygen-free atmosphere through the depositing step.

22. The method of claim 13, further comprising:

increasing the voltage in a stepwise fashion to form at least one subsequent monolayer by UPD, resulting in a plurality of monolayers.

23. The method of claim 22, wherein the stepwise voltage increase to form the at least one subsequent monolayer occurs after substantially complete deposition of a preceding monolayer.

24. The method of claim 13, wherein the interlayer has a work function value intermediate between a work function value of the surface to be coated and a work function value of the monolayer.

* * * * *